United States Patent
Toda et al.

(10) Patent No.: US 9,960,573 B2
(45) Date of Patent: May 1, 2018

(54) ELECTRONIC PART MODULE

(71) Applicant: Yazaki Corporation, Tokyo (JP)

(72) Inventors: Takafumi Toda, Kosai (JP); Takeyuki Hamaguchi, Kosai (JP)

(73) Assignee: Yazaki Corporation, Tokyo (JP)

( * ) Notice: Subject to any disclaimer, the term of this patent is extended or adjusted under 35 U.S.C. 154(b) by 290 days.

(21) Appl. No.: 13/833,382

(22) Filed: Mar. 15, 2013

(65) Prior Publication Data

US 2013/0250489 A1    Sep. 26, 2013

(30) Foreign Application Priority Data

Mar. 22, 2012   (JP) ................................ 2012-065036

(51) Int. Cl.
*H02B 1/20* (2006.01)
*B60R 16/023* (2006.01)

(52) U.S. Cl.
CPC ........... *H02B 1/20* (2013.01); *B60R 16/0238* (2013.01)

(58) Field of Classification Search
CPC ........ H01H 13/00; H01H 43/00; H01H 35/02; H01H 35/06; H01H 35/14; H01H 35/18; H01H 35/24; H01H 1/00; H01H 9/00; H01H 35/42; H01H 51/00; H01H 61/00; H01H 45/00; H01H 73/00; H01H 83/00; H01H 71/00
USPC ................................................ 439/76.1, 76.2
See application file for complete search history.

(56) References Cited

U.S. PATENT DOCUMENTS

| | | | | |
|---|---|---|---|---|
| 5,229,922 A | * | 7/1993 | Muramatsu | H01R 9/2458 361/648 |
| 5,295,842 A | * | 3/1994 | Ozaki | H01R 31/08 174/59 |
| 6,315,578 B1 | * | 11/2001 | Kasai | H01R 9/2458 439/404 |
| 6,364,670 B1 | * | 4/2002 | Wickett et al. | 439/76.2 |
| 6,430,054 B1 | * | 8/2002 | Iwata | H05K 7/026 174/560 |
| 6,493,234 B2 | * | 12/2002 | Sunami | H05K 7/026 174/260 |

(Continued)

FOREIGN PATENT DOCUMENTS

| | | |
|---|---|---|
| JP | 2005-210804 A | 8/2005 |
| JP | 2007-151296 A | 6/2007 |

OTHER PUBLICATIONS

Office Action dated Jan. 5, 2015, issued for the corresponding Chinese patent application No. 201310095027.9 and English translation thereof.

(Continued)

*Primary Examiner* — Robert J Hoffberg
*Assistant Examiner* — Matt Dhillon
(74) *Attorney, Agent, or Firm* — Locke Lord LLP

(57) ABSTRACT

An electronic part module, comprising: an electronic part substrate having an insulating panel to which a plurality of bus bars is attached, each of the bus bars having an external terminal-connecting portion and being electrically connected to an electronic part, a case for receiving the electronic part substrate therein, and a connector-connecting portion in which a plurality of the external terminal-connecting portions of the plurality of bus bars is collected, and which is disposed between a plurality of the electronic parts.

8 Claims, 14 Drawing Sheets

(56) References Cited

U.S. PATENT DOCUMENTS

| | | | |
|---|---|---|---|
| 6,541,700 B2* | 4/2003 | Chiriku | B60R 16/0238 174/50 |
| 6,672,883 B2* | 1/2004 | Kasai | B60R 16/0238 439/74 |
| 6,875,028 B2* | 4/2005 | Kita et al. | 439/76.2 |
| 7,099,155 B2* | 8/2006 | Kobayashi | B60R 16/0238 165/80.3 |
| 7,118,390 B2* | 10/2006 | Kita | 439/76.2 |
| 7,160,118 B2* | 1/2007 | Shirota | 439/76.2 |
| 7,193,841 B2* | 3/2007 | Kita | B60R 16/0239 361/641 |
| 7,566,230 B2* | 7/2009 | Ozawa | H01R 9/2466 439/76.2 |
| 7,733,632 B2* | 6/2010 | Ito | H01H 50/021 174/520 |
| 7,950,931 B2* | 5/2011 | Nakanishi | H02G 3/088 439/76.2 |
| 8,564,964 B2* | 10/2013 | Nakashima | H01R 9/2466 361/611 |
| 8,770,991 B2* | 7/2014 | Harao | H01H 85/22 439/76.2 |
| 8,913,371 B2* | 12/2014 | Depp | H01H 50/021 361/626 |
| 2002/0016093 A1* | 2/2002 | Nakamura | 439/76.2 |
| 2002/0051348 A1 | 5/2002 | Sunami et al. | |
| 2002/0168882 A1* | 11/2002 | Chiriku | H01R 12/58 439/76.2 |
| 2005/0013095 A1* | 1/2005 | Oda | H01R 9/226 361/601 |
| 2005/0111166 A1 | 5/2005 | Kita | |
| 2005/0159024 A1 | 7/2005 | Yamada et al. | |
| 2006/0021864 A1* | 2/2006 | Montanya Silvestre | G01C 19/5726 200/181 |
| 2007/0173092 A1* | 7/2007 | Von Arx | H01R 13/514 439/188 |
| 2008/0247133 A1 | 10/2008 | Ito | |
| 2008/0268671 A1* | 10/2008 | Harris | H01H 85/046 439/76.2 |
| 2008/0310121 A1* | 12/2008 | Yamashita | H01R 9/226 361/720 |
| 2014/0111908 A1* | 4/2014 | Ewing | G06F 1/189 361/626 |

OTHER PUBLICATIONS

Office Action dated Nov. 10, 2015, issued for the Japanese patent application No. 2012-065036 and English translation thereof.
Office Action dated Aug. 5, 2015, issued for the Chinese patent application No. 201310095027.9 and English translation thereof.

* cited by examiner

ELECTRONIC PART MODULE

CROSS-REFERENCE TO RELATED APPLICATIONS

This application claims priority from Japanese Patent Application No. 2012-065036 filed Mar. 22, 2012.

BACKGROUND OF THE INVENTION

1. Field of the Invention

The invention relates to an electronic part module in particular for use with electrical devices such as vehicle electrical junction boxes. More specifically, the invention relates to an electronic part module provided with an electronic part substrate having an insulating panel to which a plurality of bus bars, which is electrically connected to a plurality of electronic parts respectively and has an external terminal-connecting portion for electrically connecting an external terminal, is attached

2. Description of the Related Art

FIG. 15 shows a perspective view of a conventional electronic part module. For more detail, see JP 2005-210804 A. The conventional electronic part module 316 includes a pair of relay-connecting units 311, 315, which are opposed to each other.

In the relay-connecting unit 311, two relays 302 are mounted to a bus bar substrate 301, which includes an insulating panel 305, and a plurality of bus bars 306 arranged on the surface of the insulating panel 305. In the relay-connecting unit 315, two relays 304 are mounted to a bus substrate 303, which includes an insulating panel 312, and a plurality of bus bars 313 arranged on the surface of the insulating panel 312. Each one end portion of the plurality of bus bars 306, 313 extends beyond one edge of the insulating panels 305, 312, and functions as an external terminal-connecting portion 306c, 313c, thereby forming a connector-connecting portion.

The electronic part module 316 is received in a main body of a box such as an electrical junction box and ECU box, and each external terminal-connecting portion 306c, 313c of the bus bars 306, 313 extends into a housing thereby forming the connector-connecting portion into which a connector of a wiring harness and so on is inserted or fitted.

The above electronic part module 316 is disposed such that the external terminal-connecting portion 306c, 313c and the relays 302 and 304 are respectively aligned or arranged in a direction in which the external terminal-connecting portions 306c, 313c extend from the insulating panels 305, 312 respectively. In other words, the direction can be defined by a direction in which the connector is inserted or fitted into the connector-connecting portion. For the above reason, the dimension of the electronic part module 316 along the above direction is made equal to the sum of the lengths of the relay 302, 304 and the length of the external terminal-connecting portion 306c, 313c. The electronic part module 316 has been needed to be further downsized.

SUMMARY OF THE INVENTION

In light of the above, the invention is to provide an electronic part module, which can downsize its length along a direction where an external terminal is electrically connected to an external terminal-connecting portion.

In one aspect, the invention provides an electronic part module, which comprises (i) an electronic part substrate having an insulating panel to which a plurality of bus bars is attached, each of the bus bars having an external terminal-connecting portion and being electrically connected to an electronic part, (ii) a case for receiving the electronic part substrate therein, and (iii) a connector-connecting portion in which a plurality of the external terminal-connecting portions of the plurality of bus bars is collected, and which is disposed between a plurality of the electronic parts.

In another aspect, the invention provides an electronic part module, which comprises an electronic part substrate having an insulating panel to which a plurality of bus bars is attached. Each of the bus bars has an external terminal-connecting portion and is electrically connected to an electronic part. The plurality of the external terminal-connecting portions respectively extends from the insulating panel in one direction. In this configuration, a direction in which the plurality of external terminal-connecting portions and a plurality of the electronic parts are aligned intersects a direction in which an external terminal is electrically connected to the external terminal-connecting portion.

In above configurations, the plurality of electronic parts may be aligned in two rows, and the plurality of external terminal-connecting portions may be disposed between the two rows of the electronic parts.

In above configurations, each of the bus bars may further comprises a part-mounting portion in which the electronic part is mounted, and an intermediate portion disposed between the part-mounting portion and the external terminal-connecting portion. All of the part-mounting portions and the intermediate portions may lie in a same plane.

In above configurations, the electronic part module may comprise a pair of the electronic part substrates. Each of the bus bars may further comprise a part-mounting portion to which the electronic part is mounted, and an intermediate portion disposed between the part-mounting portion and the external terminal-connecting portion. The insulating panel of each of the electronic part substrate may have a first surface to which the part-mounting portion is attached, a second surface to which the intermediate portion is attached, and a third surface which is opposed to the first surface and to which an end portion of the external terminal-connecting portion adjacent to the intermediate portion is attached. The pair of electronic part substrates may be disposed such that the third surfaces of the pair of electronic part substrates are opposed to each other.

In the above configuration, the electronic part may be a relay.

These and other features, aspects, and advantages of the present invention will become better understood upon consideration of the following detailed description, drawings, and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

First Embodiment of Electronic Part Module

A first embodiment of an electronic part module in accordance with the invention will be described in detail with reference to FIGS. 1-5.

Figure 1:
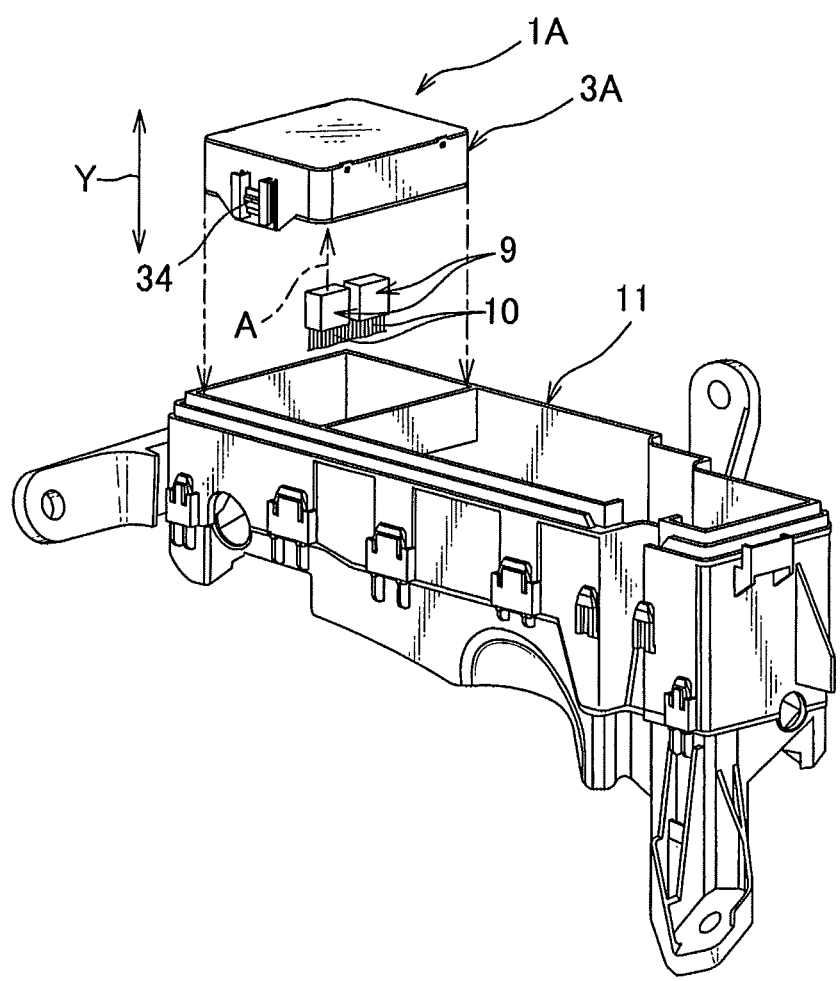
FIG. 1 is a perspective view depicting an electronic part module in accordance with a first embodiment of the invention, a connector to be inserted into the electronic part module, and a case of an electrical junction box to be attached to the electronic part module.
Figure 2:
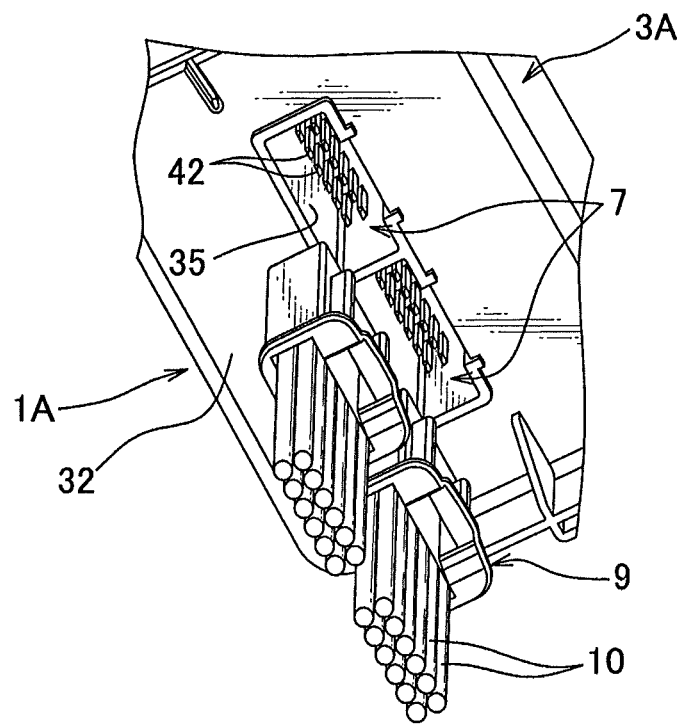
FIG. 2 is a perspective view depicting a connector-connecting portion of the electronic part module of FIG. 1, and a connector to be inserted into the connector-connecting portion.

An electronic part module 1A is configured to perform electrical power distribution in a vehicle electrical junction box. Referring to FIG. 1, the electronic part module 1A is configured to be attached to a case 11 of an electrical junction box. Referring to FIG. 2, a connector-connecting portion 7 is formed in the bottom (or bottom wall) 32 of the electronic part module 1A, and is configured to engage a connector 9 of a wiring harness. The connector 9 accommodates a plurality of female terminal fittings (i.e., external terminals) coupled to the terminal of an electrical wire 10. Furthermore, the arrow "A" in FIG. 1 represents a direction in which the connector 9 is inserted or fitted into the connector-connecting portion 7, and the arrow "Y" in FIG. 1 represents a direction along the height of the case 11. The arrows "A" and "Y" are parallel to each other.

Figure 4:
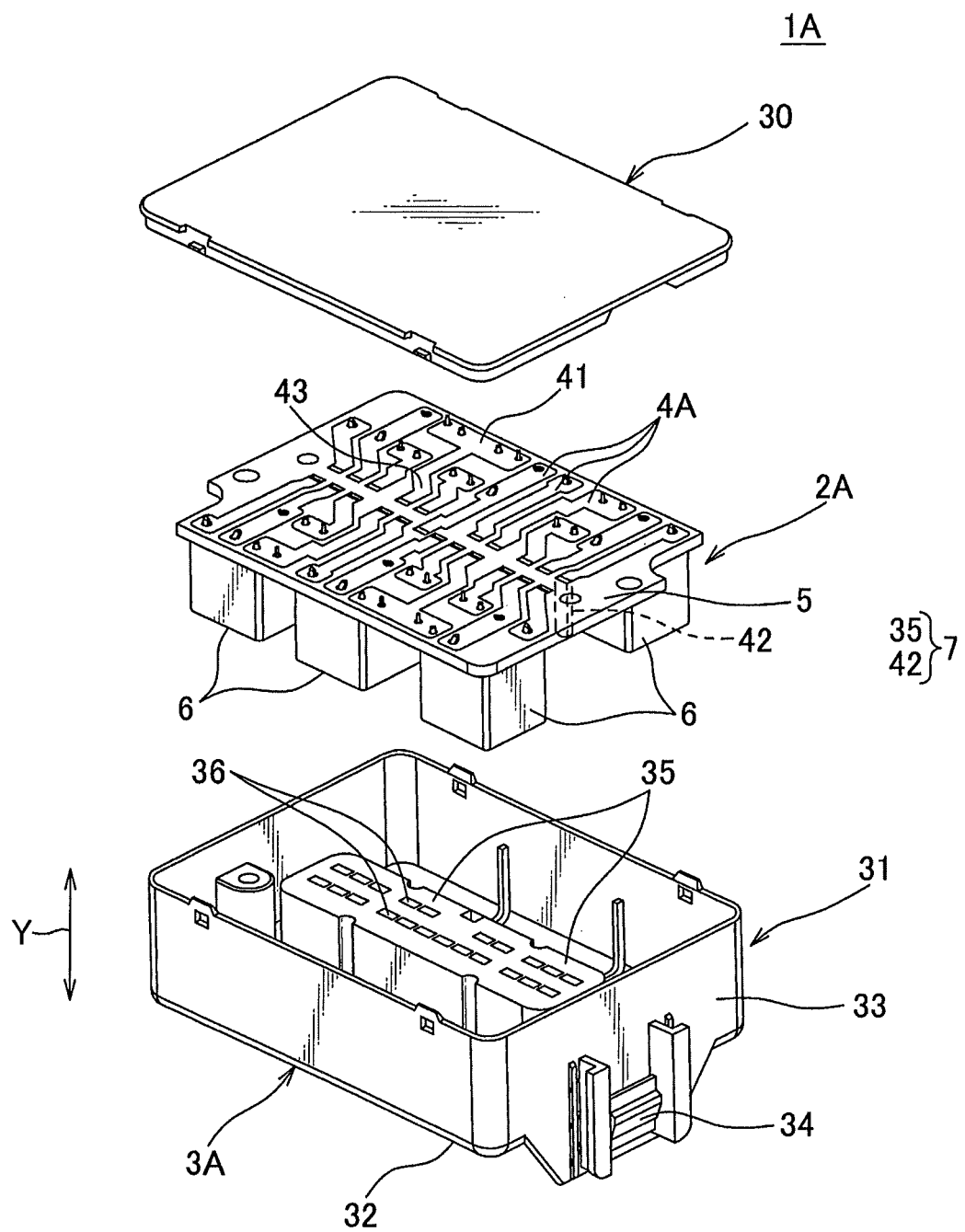
FIG. 4 is an exploded view of the electronic part module of FIG. 1.
Figure 5:
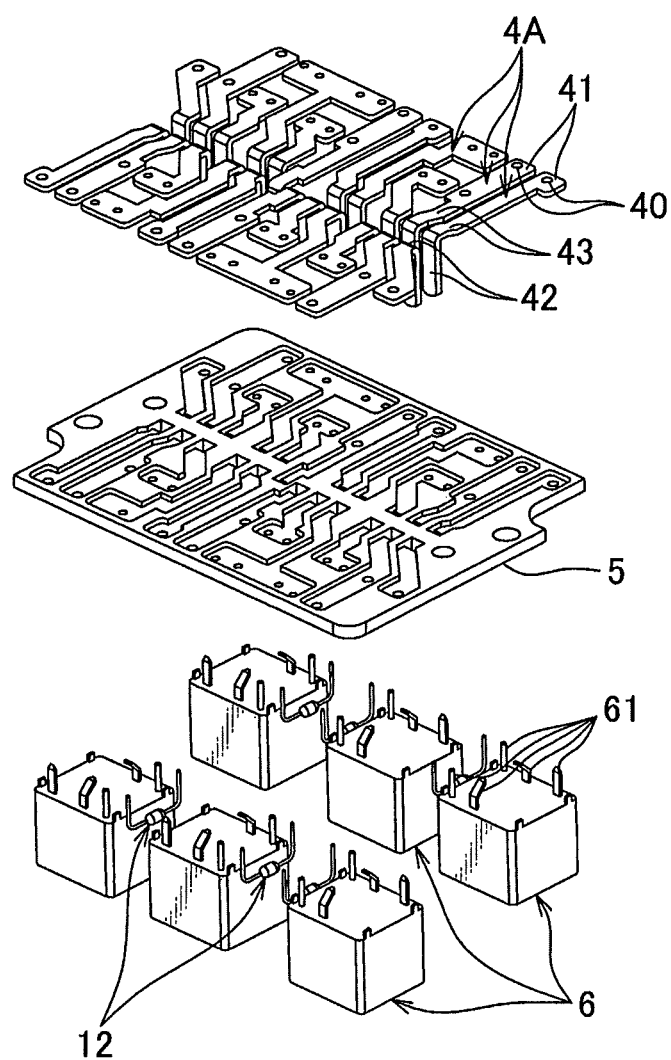
FIG. 5 is an exploded view of an electronic part substrate as shown in FIG. 4.

Referring to FIG. 4, the electronic part module 1A includes an electronic part substrate 2A in which a plurality of bus bars 4A is coupled to a plate-like insulating panel 5 and a plurality of substrate relays 6 corresponding to electronic parts as defined in the claims appended hereto is electrically connected to the plurality of bus bars 4A, and a case 3A for accommodating the electronic part substrate 2A therein and formed of synthetic resin. Furthermore, in the bottom (i.e., the bottom wall) 32 of the case 3A there is provided the connector-connecting portion 7, as mentioned previously.

The plurality of bus bars 4A is obtained by, for example, pressing metallic plate, and includes a part-mounting portion 41 in which a relay 6 and a resistance 12 are mounted, an external terminal-connecting portion 42, and an intermediate portion 43 disposed between the part-mounting portion 41 and the external terminal-connecting portion 42. In the part-mounting portion 41 a through-hole 40 is formed such that the terminal portion 61 of the relay 6 or the terminal portion of the resistance 12 pass therethrough. The part-mounting portion 41 and the intermediate portion 43 are flat, and lie in the same plane. The external terminal-connecting portion 42 is bar-shaped, and is at a right angle with the intermediate portion 43, specifically one end of the intermediate portion 43. The external terminal-connecting portion 42 forms the connector-connecting portion 7, thereby being inserted into and then electrically connected to the female terminal fitting of the connector 9.

In the electronic part substrate 2A, all of the part-mounting portions 41 and the intermediate portions 43 of the bus bars 4A are integrated into the insulating panel 5, and lie in the same plane. All of the external terminal-connecting portions 42 of the bus bars 4A are collected in the center of the insulating panel 5 to extend in a direction perpendicular to the insulating panel 5. In other words, in the electronic part substrate 2A, the direction in which the plurality of external terminal-connecting portions 42 and the plurality of relays 6 are aligned intersects the direction in which the female terminal fitting of the connector 9 is electrically connected to the external terminal-connecting portion 42. Furthermore, the direction in which the female terminal fitting of the connector 9 is electrically connected to the external terminal-connecting portion 42 is perpendicular to the insulating panel 5.

Furthermore, in the electronic part substrate 2A, the plurality of relays 6 is aligned in two rows, and the plurality of external terminal-connecting portions 42 is disposed between the two rows of the relays 6. In other words, the plurality of external terminal-connecting portion 42 is disposed between the plurality of the relays 6. In the planar view viewed from the direction perpendicular to the insulating panel 5, the electronic part substrate 2A is disposed such that the bus bars 4A do not overlap with each other.

As such, the electronic part substrate 2A is assembled by collectively forming the plurality of bus bars 4A from metallic plate with a die, bending the bus bars 4A to form the external terminal-connecting portion 42, attaching the plurality of bus bars 4A to the insulating panel 5 via insert-molding, and soldering the relay 6 and the resistance 12 to the plurality of bus bars 4A. Instead of insert-molding, the plurality of bus bars 4A may be locked to and attached to the insulating panel 5.

Figure 3:
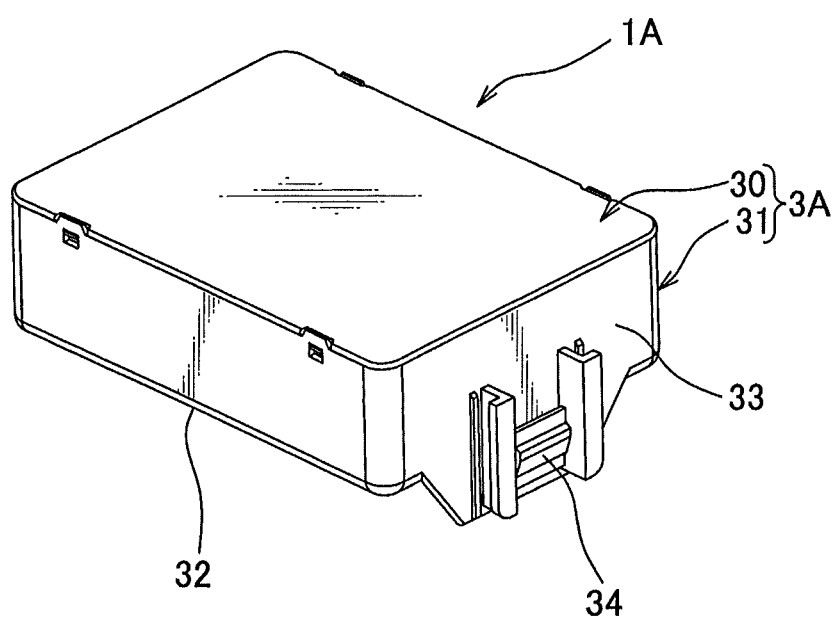
FIG. 3 is an enlarged view of the electronic part module of FIG. 1.

Referring to FIGS. 3 and 4, the case 3A includes a box-shaped portion 31, and a cover 30 for closing the opening of the box-shaped portion 31. The box-shaped portion 31 includes a bottom wall 32, a peripheral wall 33, a locking portion 34 formed on the outer surface of the peripheral wall 33, and a convex portion 35 formed from the (inner) bottom wall 32 toward the cover 30. The electronic part module 1A can be locked to the case 11 of the afore-mentioned electrical junction box via the locking portion 34. Referring to FIG. 2, the connector-connecting portion 7 includes the convex portion 35. Two convex portion 35 can be formed. Furthermore, a through-hole 36 through which the external terminal-connecting portion 42 passes is formed in the top (i.e., upper end surface) of the convex portion 35. The top of the convex portion 35 corresponds to the portion of the convex portion 35 most adjacent to the cover 30). The number of the trough-holes 36 corresponds to the number of external terminal-connecting portions 42, which constitute the connector-connecting portion 7.

The connector-connecting portion 7 includes the plurality of external terminal-connecting portions 42 of the afore-mentioned electronic part substrate 2A, and the convex portion 35 formed in the afore-mentioned case 3A. In other words, the electronic part substrate 2A is received into the box-shaped portion 31 in a direction as shown in FIG. 4. As such, the plurality of the external terminal-connecting portion 42, in turn, passes through the through-hole 36 to be positioned in the convex portion 35. As a result, the connector-connecting portion 7 is formed. The connector-connecting portion 7 is disposed between the plurality of relays 6. In the electronic part module 1A, two connector-connecting portions 7 can be provided. The two connector-connecting portions 7 can be aligned along a longitudinal direction of the case 3A. Furthermore, the direction in which the connector 9 of the wiring harness is inserted or fitted into the connector-connecting portion 7 is perpendicular to the insulating panel 5.

Figure 15:
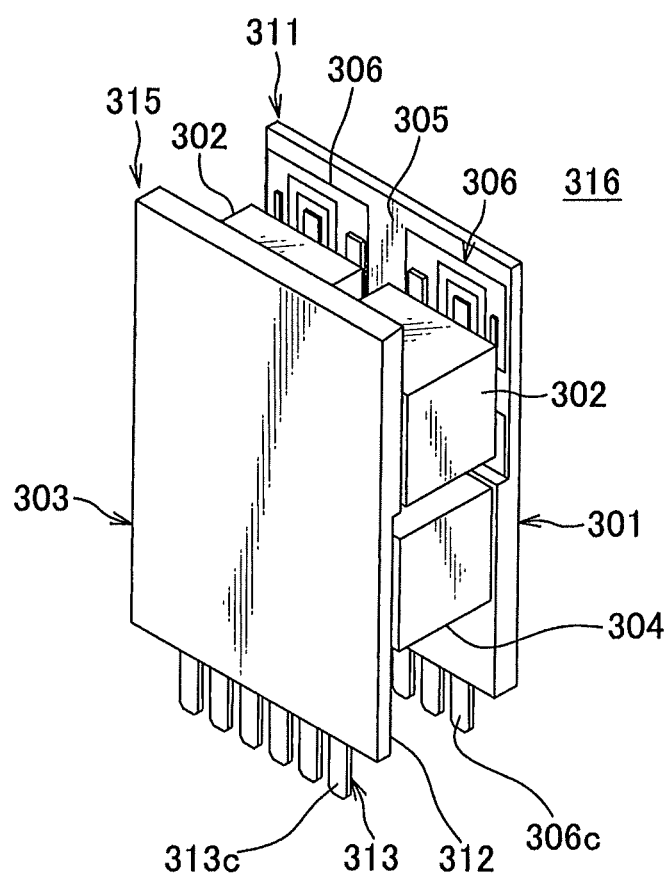
FIG. 15 is a perspective view of a conventional electronic part module.

In the afore-mentioned electronic part module 1A, the connector-connecting portion 7 is disposed between the two rows of relays 6. The direction in which the plurality of external terminal-connecting portions 42 and the plurality of the relays 6 are aligned (i.e., the width direction of the insulating panel 5) intersects with the direction in which the female terminal fitting of the connector 9 is electrically connected to the external terminal-connecting portion 42 (i.e., the direction perpendicular to the insulating panel 5). Accordingly, the minimum dimension of the case 3A along its height (i.e., a direction depicted by arrow "Y") corresponds to the sum of the thickness of the insulating panel 5, the height of the relay 6, the thickness of the bottom wall 32 of the case 3A and the thickness of the cover 30. Therefore, the size of the electronic part module 1A can be remarkably decreased in comparison with the conventional electronic part module as depicted in FIG. 15.

In the afore-mentioned electronic part module 1A, there is provided the plurality of relays 6 that is aligned in two rows. The plurality of external terminal-connecting portions 42 is disposed between the two rows of the relays. Therefore, simple and shortest path between each relay 6 and each external terminal-connecting portion 42 can be attained, thereby allowing the amount of metal used for forming the bus bar 4A to decrease.

In the afore-mentioned electronic part module 1A, the part-mounting portion 41 and the intermediate portion 43 of each bus bar 4A are arranged on the same plane. For the reason, the plurality of bus bars 4A can be easily attached to the insulating panel 5 by insert-molding, and the thickness of the insulating panel 5 can be decreased. As a result, the heightwise dimension of the case 3A can be downsized.

When the first embodiment of the electronic part module 1A is mounted to the electric junction box, the heightwise dimension of the case 11 (of the electric junction box) can be downsized.

Second Embodiment of Electronic Part Module

A second embodiment of electronic part module is hereinafter described with reference to FIGS. 6-8. Similar or equal reference numerals represent the parts similar or equal to the parts as described in the first embodiment.

An electronic part module 1B is also configured to perform electrical power distribution in a vehicle electrical junction box, and to be attached to a case 11 of an electrical junction box as shown in FIG. 1. Referring to FIG. 7, a connector-connecting portion 7 is formed in the bottom (or bottom wall) 32 of the electronic part module 1B, and is configured to engage a connector 9 of a wiring harness. Furthermore, the arrow "B" in FIG. 7 represents a direction in which the connector 9 is inserted or fitted into the connector-connecting portion 7, and the arrow "Y" in FIG. 7 represents a direction along the height of the case 11. The arrows "B" and "Y" are parallel to each other.

Figure 7:
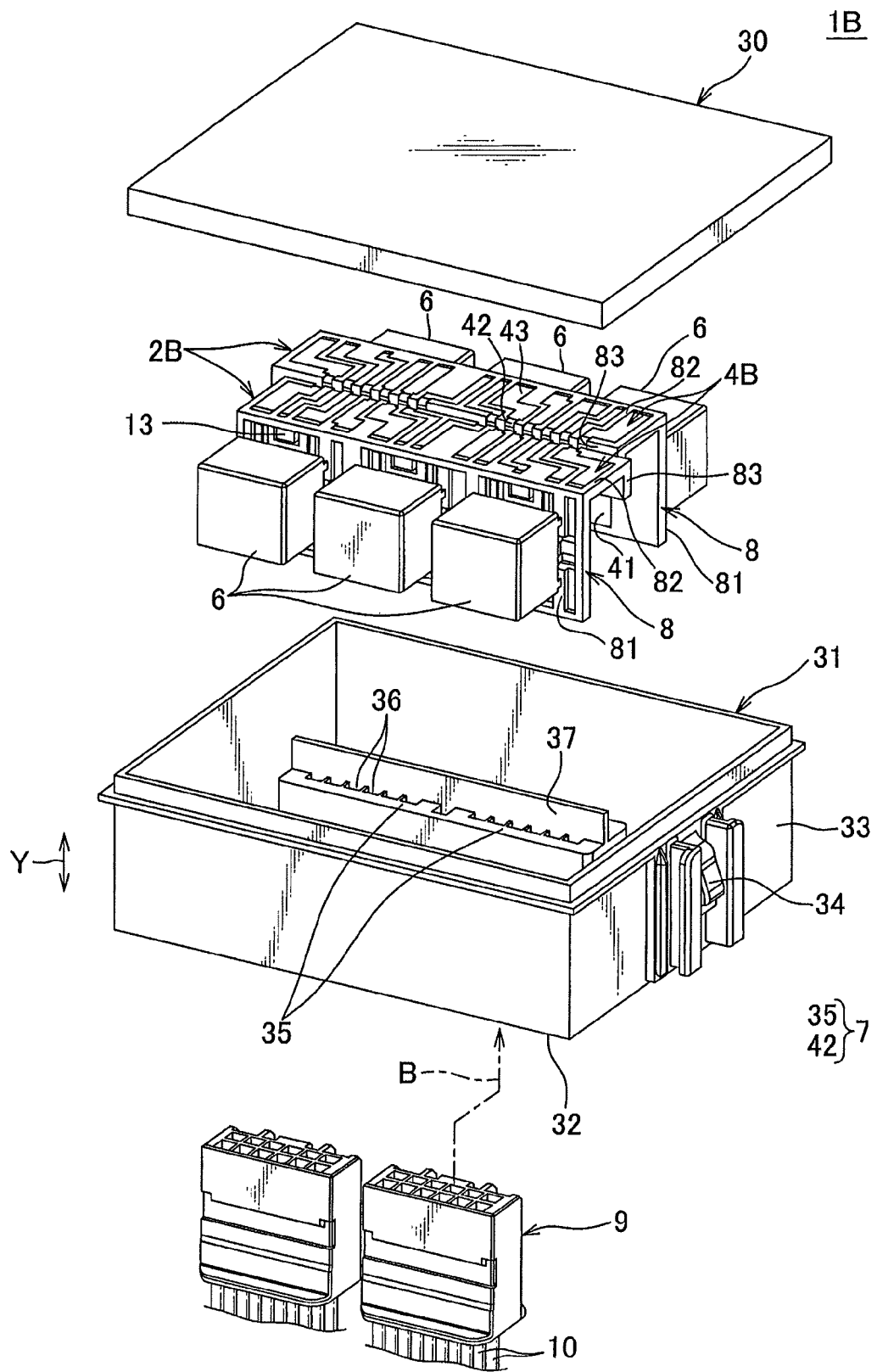
FIG. 7 is an exploded view of the electronic part module of FIG. 6.

Referring to FIG. 7, the electronic part module 1B includes a pair of electronic part substrates 2B in which a plurality of bus bars 4B is coupled to an insulating panel 8 and a plurality of substrate relays 6 corresponding to electronic parts as defined in the claims appended hereto is electrically connected to the plurality of bus bars 4B, and a case 3B for accommodating the pair of electronic part substrates 2B therein and formed of synthetic resin. Furthermore, in the bottom (i.e., bottom wall) 32 of the case 3B there is provided the connector-connecting portion 7, as mentioned previously.

Figure 8:
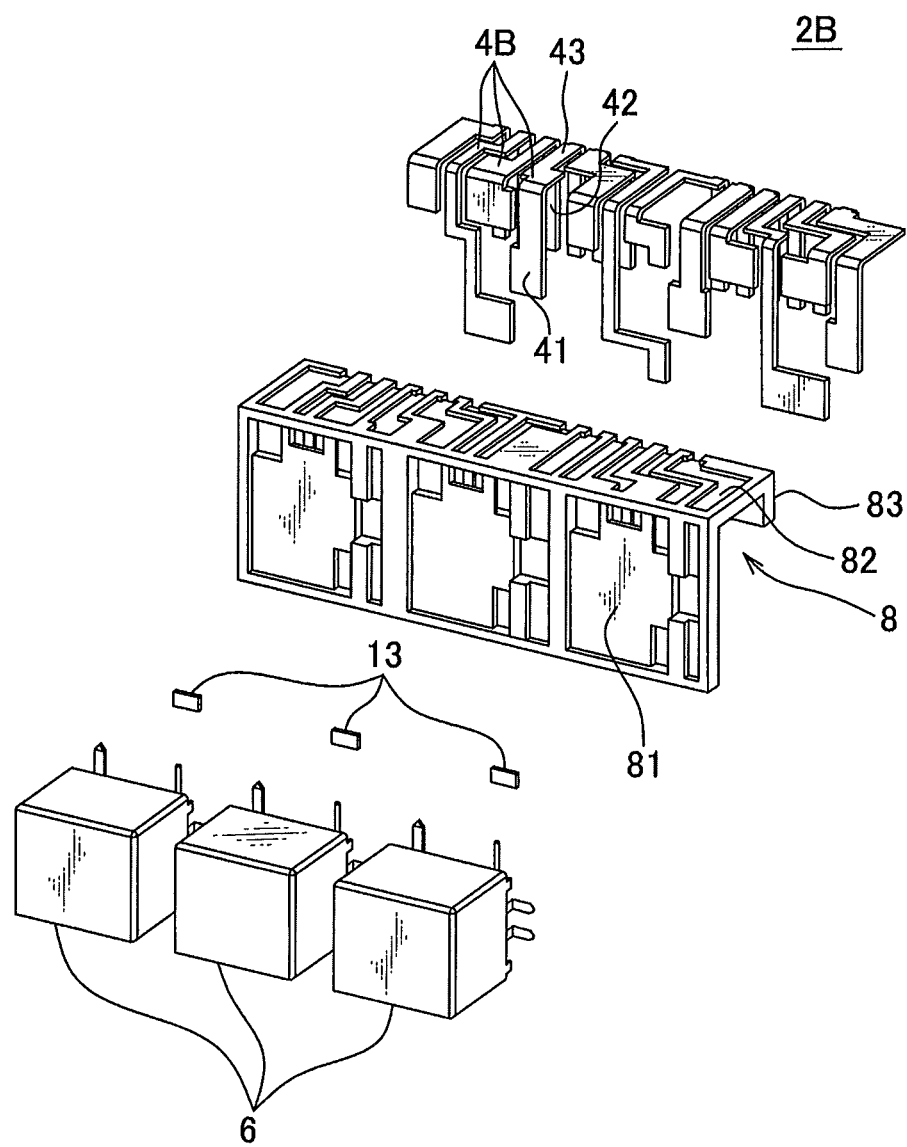
FIG. 8 is an exploded view of an electronic part substrate as shown in FIG. 7.

As shown in FIGS. 7 and 8, each of the plurality of bus bars 4B includes a part-mounting portion 41 in which a relay 6 and a resistance 13 are mounted, an external terminal-connecting portion 42, and an intermediate portion 43 disposed between the part-mounting portion 41 and the external terminal-connecting portion 42. The bus bar 4B is identical to the bus bar 4A as described in the first embodiment of the invention excluding that the part-mounting portion 41 is formed by bending the other end portion (i.e., the opposite end portion) of the bus bar 4B in the same direction as the external terminal-connecting portion 42 extends. In other words, the external terminal-connecting portion 42 forms the connector-connecting portion 7, thereby being inserted into and then electrically connected to the female terminal fitting of the connector 9, as depicted in the first embodiment.

Referring to FIGS. 7 and 8, the insulating panel 8 includes a first surface 81 to which the part-mounting portion 41 of the bus bar 4 is attached, a second surface 82 to which the intermediate portion 43 of the bus bar 4 is attached, and a third surface 83 to which one end portion of the external terminal-connecting portion 42 adjacent to the intermediate portion 43 is attached. Furthermore, the first surface 81 is opposed to the third surface 83.

In the electronic part substrate 2B, all of the part-mounting portions 41 of the bus bars 4B are integrated into the first surface 81 of the insulating panel 8, and lie in the same plane. All of the intermediate portions 43 of the bus bars 4B are integrated into the second surface 82, and lie in the same plane. All of the external terminal-connecting portions 42 of the bus bars 4B are integrated into the third surface 83, and lie in the same plane. Furthermore, the other end of the external terminal-connecting portion 42 of each bus bar 4B extends from one edge (i.e., one end) of the third surface 83, and is parallel to the first surface 81. In other words, in the electronic part substrate 2B, the direction in which the plurality of external terminal-connecting portions 42 and the plurality of relays 6 are aligned intersects the direction in which the female terminal fitting of the connector 9 is electrically connected to the external terminal-connecting portion 42. Furthermore, the direction in which the female terminal fitting of the connector 9 is electrically connected to the external terminal-connecting portion 42 is parallel to the first surface 81.

In the electronic part substrate 2B, the plurality of relays 6 is aligned in a direction intersecting the direction in which the female terminal fitting of the connector 9 is electrically connected to the external terminal-connecting portion 42. Furthermore, the pair of electronic part substrates 2B is disposed within the case 3B such that the third surfaces 83 of the pair of electronic part substrates 2B are opposed to each other. Accordingly, in accordance with the second embodiment of the electronic part module (1B), the plurality of relays 6 is aligned in two rows, and the plurality of external terminal-connecting portions 42 is disposed between the two rows of the relays 6. In other words, the plurality of external terminal-connecting portion 42 is disposed between the plurality of the relays 6.

The electronic part substrate 1B is assembled by collectively forming the plurality of bus bars 4B from metallic plate with a die, bending the bus bars to form the part-mounting portion 41 and the external terminal-connecting portions 42, attaching the plurality of bus bars 4B to the insulating panel 8 via insert-molding, and soldering the relay 6 and the resistance 13 to the plurality of bus bars 4B. Instead of insert-molding, the plurality of bus bars 4B may be locked and attached to the insulating panel 8.

Figure 6:
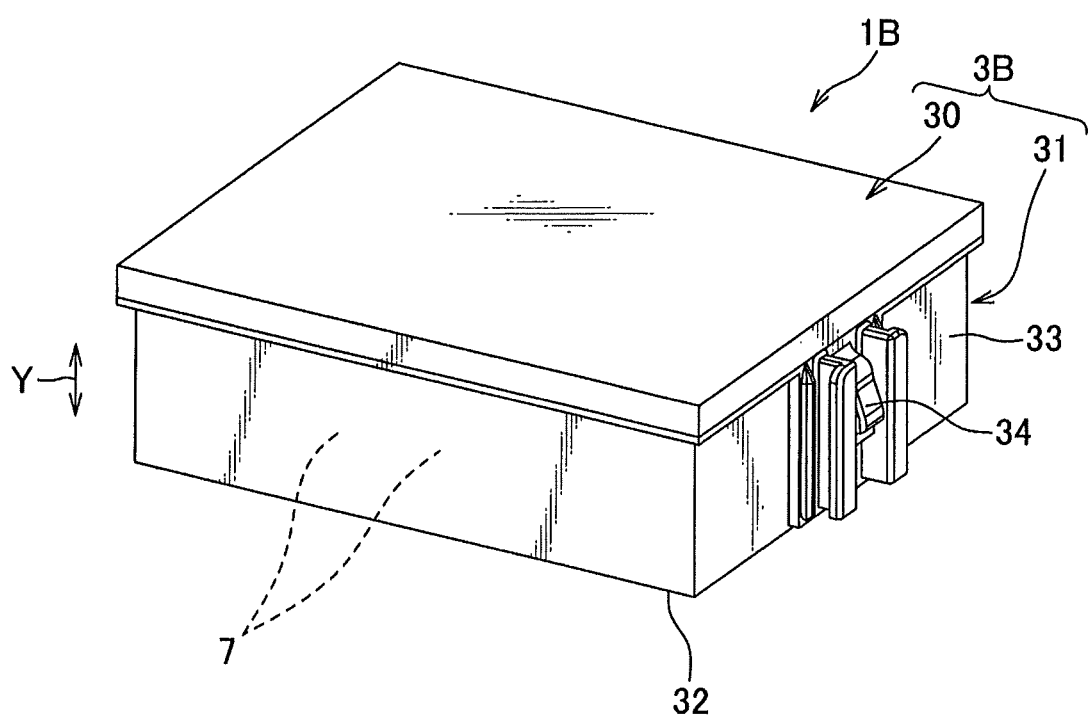
FIG. 6 is a perspective view of an electronic part module in accordance with a second embodiment of the invention.

Referring to FIGS. 6 and 7, the case 3B includes a box-shaped portion 31, and a cover 30 for closing the opening of the box-shaped portion 31. The box-shaped portion 31 includes a bottom wall 32, a peripheral wall 33, a locking portion 34 formed on the outer surface of the peripheral wall 33, a convex portion 35 for forming the connector-connecting portion 7, and an external terminal-connecting portion-holding wall 37 extending from the top of the convex portion 35 (i.e., the portion of the convex portion 35 most adjacent to the cover 30) toward the cover 30. As such, one end of the external terminal-connecting portion 42 is hold or sandwiched between the third surface 83 and the external terminal-connecting portion-holding wall 37.

The connector-connecting portion 7 includes the plurality of external terminal-connecting portions 42 of the afore-mentioned electronic part substrate 2B, and the convex portion 35 formed in the afore-mentioned case 3B. In other words, the pair of electronic part substrates 2B is received into the box-shaped portion 31 in a direction as shown in FIG. 7. As such, the plurality of the external terminal-connecting portions 42, in turn, passes through the through-hole 36 to be positioned within the convex portion 35. As a result, the connector-connecting portion 7 is formed. The connector-connecting portion 7 is disposed between the plurality of relays 6. In the electronic part module 1B, two connector-connecting portions 7 can be provided. The two connector-connecting portions 7 can be aligned in a longitudinal direction of the case 3B. Furthermore, the direction in which the connector 9 of the wiring harness is inserted or fitted into the connector-connecting portion 7 is parallel to the first surface 81.

In the afore-mentioned electronic part module 1B, the connector-connecting portion 7 is disposed between the two rows of relays 6. The direction in which the plurality of external terminal-connecting portions 42 and the plurality of the relays 6 are aligned intersects with the direction in which the female terminal fitting of the connector 9 is electrically connected to the external terminal-connecting portion 42 (i.e., the direction parallel to the first surface 81). For the reason, the minimum dimension of the case 3B along its height (i.e., a direction depicted by arrow "Y") can be remarkably decreased in comparison with the conventional electronic part module as depicted in FIG. 15.

When the second embodiment of the electronic part module 1B is mounted to the electric junction box, the heightwise dimension of the case 11 (of the electric junction box) can be downsized. In addition, liquid due to condensation inside the case 3B is prevented from remaining between the relay 6 and the insulating panel 8, thereby allowing the prevention of rusting.

Third Embodiment of Electronic Part Module

A third embodiment of electronic part module is hereinafter described with reference to FIGS. 9-11. Similar or equal reference numerals represent the parts similar or equal to the parts as described in the first and second embodiments.

An electronic part module 101A is also configured to perform electrical power distribution in a vehicle electrical junction box, and to be attached to a case of an electrical junction box (not shown), as mentioned in the first embodiment of the electronic part module 1A. Referring to FIG. 9, a connector-connecting portion 107A is formed in the electronic part module 101A, and is configured to engage a connector 9 of a wiring harness. Furthermore, the arrow "C" in FIG. 10 represents a direction in which the connector 9 is inserted or fitted into the connector-connecting portion 107A, and the arrow "Y" in FIG. 10 represents a direction along the height of the case of the electrical junction box. The arrows "C" and "Y" are parallel to each other.

Figure 9:
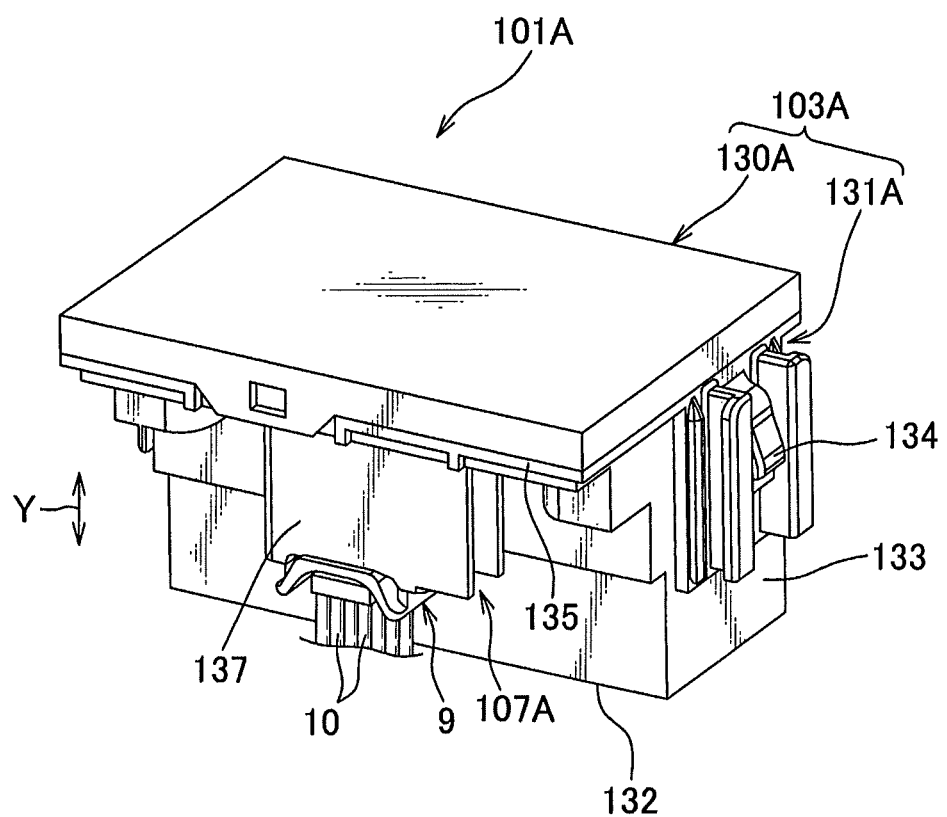
FIG. 9 is a perspective view of an electronic part module in accordance with a third embodiment of the invention.
Figure 10:
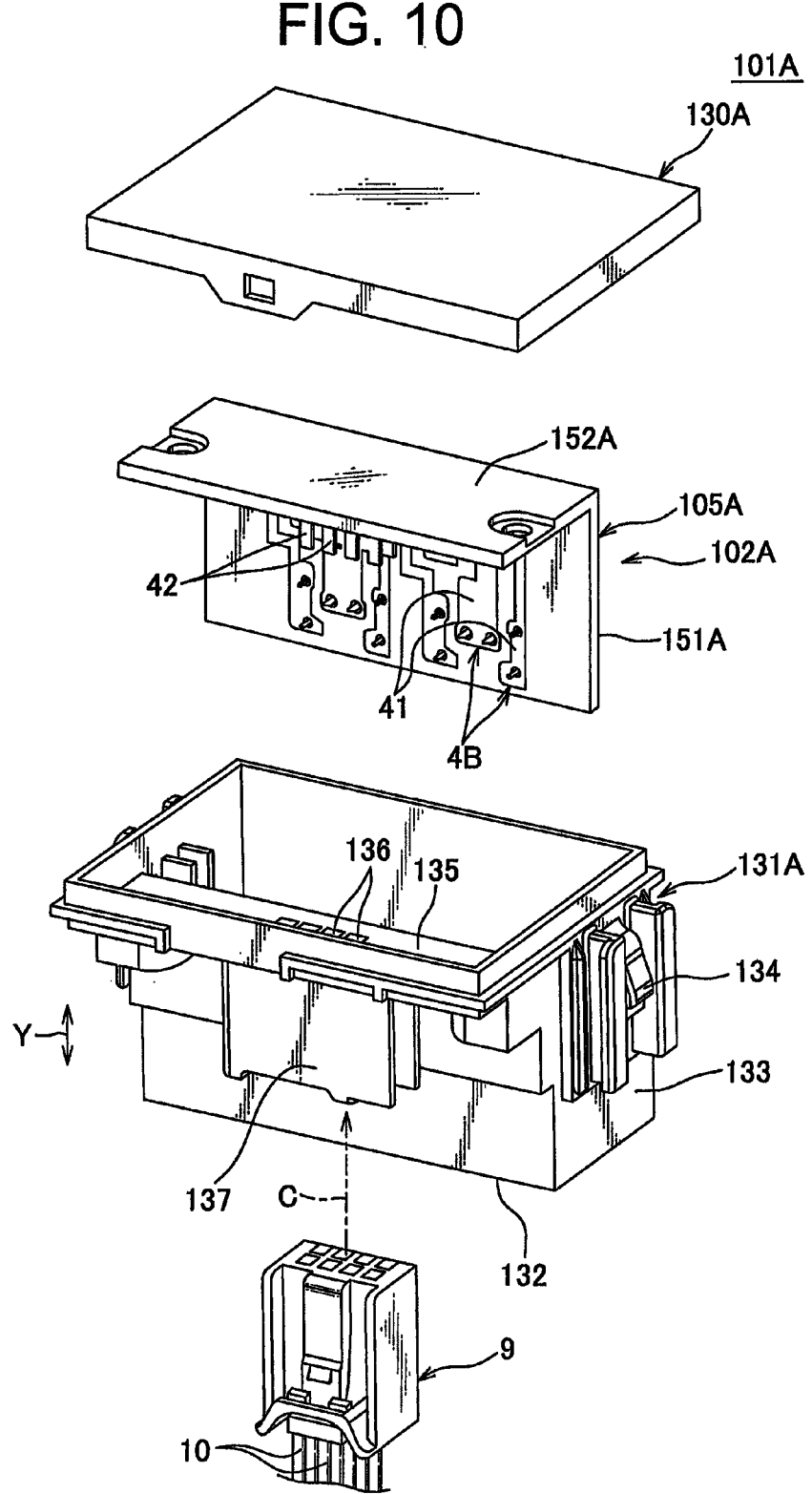
FIG. 10 is an exploded view of the electronic part module of FIG. 9.
Figure 11:
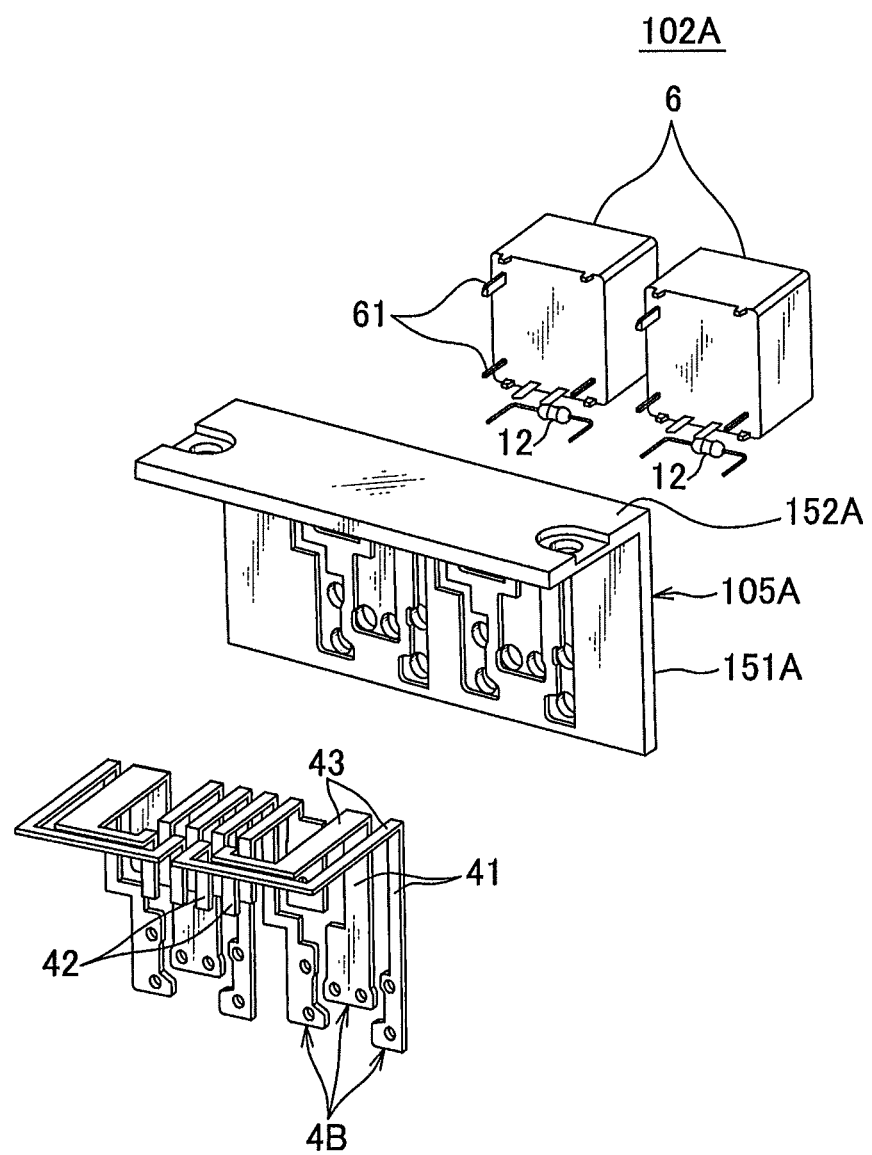
FIG. 11 is an exploded view of an electronic part substrate as shown in FIG. 10.

Referring to FIGS. 9-11, the electronic part module 101A includes an electronic part substrates 102A in which a plurality of bus bars 4B is coupled to an insulating panel 105A and a plurality of substrate relays 6 corresponding to electronic parts as defined in the claims appended hereto is electrically connected to the plurality of bus bars 4B, and a case 103A for accommodating the electronic part substrates 102A therein and formed of synthetic resin. Furthermore, the afore-mentioned connector-connecting portion 107A is made lateral to the case 103A.

As shown in FIGS. 10 and 11, the plurality of bus bars 4B includes a part-mounting portion 41 in which a relay 6 and a resistance 12 are mounted, an external terminal-connecting portion 42, and an intermediate portion 43 disposed between the part-mounting portion 41 and the external terminal-connecting portion 42. The external terminal-connecting portion 42 forms the connector-connecting portion 107A, thereby being inserted into and then electrically connected to the female terminal fitting of the connector 9.

Referring to FIG. 10, the insulating panel 105A includes a first surface 151A to which the part-mounting portion 41 of the bus bar 4B is attached, and a second surface 152A to which the intermediate portion 43 is attached. The first surface 151A is at right angle with the second surface 152A.

In the electronic part substrate 102A, all of the part-mounting portions 41 of the bus bars 4B are integrated into the first surface 151A of the insulating panel 105A, and lie in the same plane. All of the intermediate portions 43 of the bus bars 4B are integrated into the second surface 152A, and lie in the same plane. All of the external terminal-connecting portions 42 of the bus bars 4B extends from the second surface 152A and is parallel to the first surface 151A. In other words, in the electronic part substrate 102A, the direction in which the plurality of external terminal-connecting portions 42 and the plurality of relays 6 are aligned intersects the direction in which the female terminal fitting of the connector 9 is electrically connected to the external terminal-connecting portion 42. Furthermore, the direction in which the female terminal fitting of the connector 9 is electrically connected to the external terminal-connecting portion 42 is parallel to the first surface 151A.

The electronic part substrate 102A is assembled by collectively forming the plurality of bus bars 4B from metallic plate with a die, bending the bus bars to form the part-mounting portion 41 and the external terminal-connecting portions 42, attaching the plurality of bus bars 4B to the insulating panel 105A via insert-molding, and soldering the relay 6 and the resistance 12 to the plurality of bus bars 4B. Instead of insert-molding, the plurality of bus bars 4B may be locked and attached to the insulating panel 105A.

Referring to FIGS. 9 and 10, the case 103A includes a box-shaped portion 131A, and a cover 130A for closing the opening of the box-shaped portion 131A. The box-shaped portion 131A includes a bottom wall 132, a peripheral wall 133, a locking portion 134 formed on the outer surface of the peripheral wall 133, a flange 135 formed on the upper edge or upper end of the peripheral wall 133, and an external terminal-accommodating portion 137 downwardly extending from the flange 135. The locking portion 134 is locked to the case of the afore-mentioned electrical junction box. The external terminal-accommodating portion 137 can form a connector-connecting portion 107A which will be hereinafter described in detail, and is configured to position the plurality of external terminal-connecting portions 42 and the connector 9 therein. The flange 135 is provided with a through-hole 136 through which the external terminal-connecting portion 42 passes. The number of the through-holes 136 is equivalent to the number of the number of the external terminal-connecting portions 42 capable of forming the connector-connecting portion 107A.

The connector-connecting portion 107A includes the plurality of external terminal-connecting portion 42 of the afore-mentioned electronic part substrate 102A, and the external terminal-accommodating portion 137 formed in the afore-mentioned case 103A. In other words, the electronic part substrates 102A is received into the box-shaped portion 131A in a direction as shown in FIG. 10. As such, the plurality of the external terminal-connecting portion 42, in turn, passes through the through-hole 36 to be positioned in the external terminal-accommodating portion 137. As a result, the connector-connecting portion 107A can be formed. Furthermore, the plurality of external terminal-connecting portions 42 is arranged in two rows. The direction in which the connector 9 of the wiring harness is inserted or fitted into the connector-connecting portion 107A is parallel to the first surface 151A.

In the afore-mentioned electronic part module 101A, the direction in which the plurality of external terminal-connecting portions 42 and the plurality of the relays 6 are aligned intersects with the direction in which the female terminal fitting of the connector 9 is electrically connected to the external terminal-connecting portion 42 (i.e., the direction parallel to the first surface 151A). For the reason, the minimum dimension of the case 103A along its height (i.e., a direction depicted by arrow "Y") can be remarkably decreased in comparison with the conventional electronic part module as depicted in FIG. 15.

When the third embodiment of the electronic part module 101A is mounted to the electric junction box, the heightwise dimension of the case (of the electric junction box) can be downsized.

Fourth Embodiment of Electronic Part Module

A fourth embodiment of electronic part module is hereinafter described with reference to FIGS. 12-14. Similar or equal reference numerals represent the parts similar or equal to the parts as described in the first, second, and third embodiments.

An electronic part module 101B is also configured to perform electrical power distribution in a vehicle electrical junction box, and to be attached to a case of an electrical junction box (not shown) as mentioned in the third embodiment of the electronic part module 101A. Referring to FIG. 12, a connector-connecting portion 107B is formed in the electronic part module 102B, and is configured to engage a female terminal fitting (i.e., an external terminal) coupled to the terminal portion of an electrical wire. Furthermore, the arrow "D" in FIG. 13 represents a direction in which the female terminal fitting is inserted or fitted into the connector-connecting portion 107B, and the arrow "Y" in FIG. 13 represents a direction along the height of the case of the electrical junction box. The arrows "D" and "C" are parallel to each other.

Figure 13:
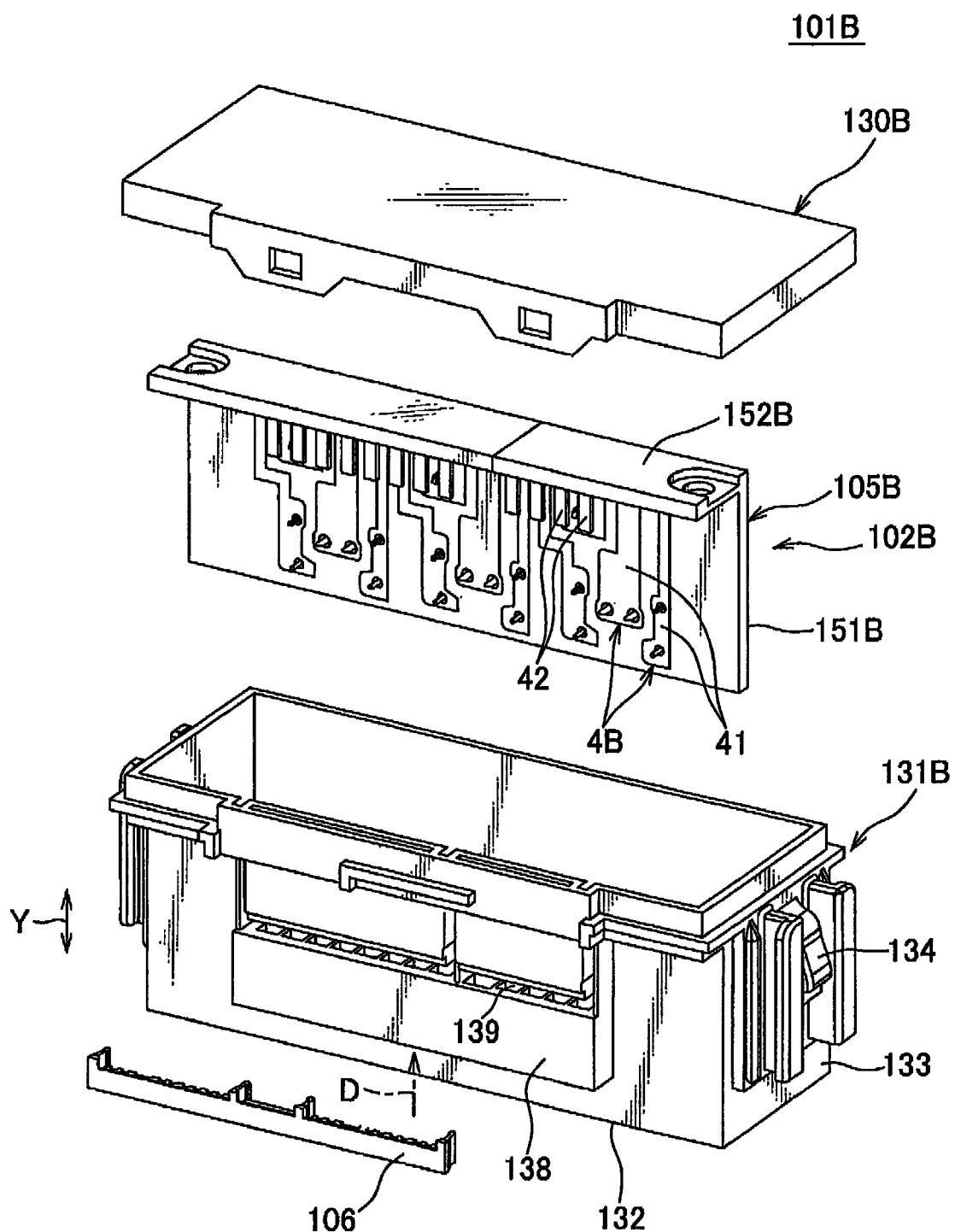
FIG. 13 is an exploded view of the electronic part module of FIG. 12.
Figure 14:
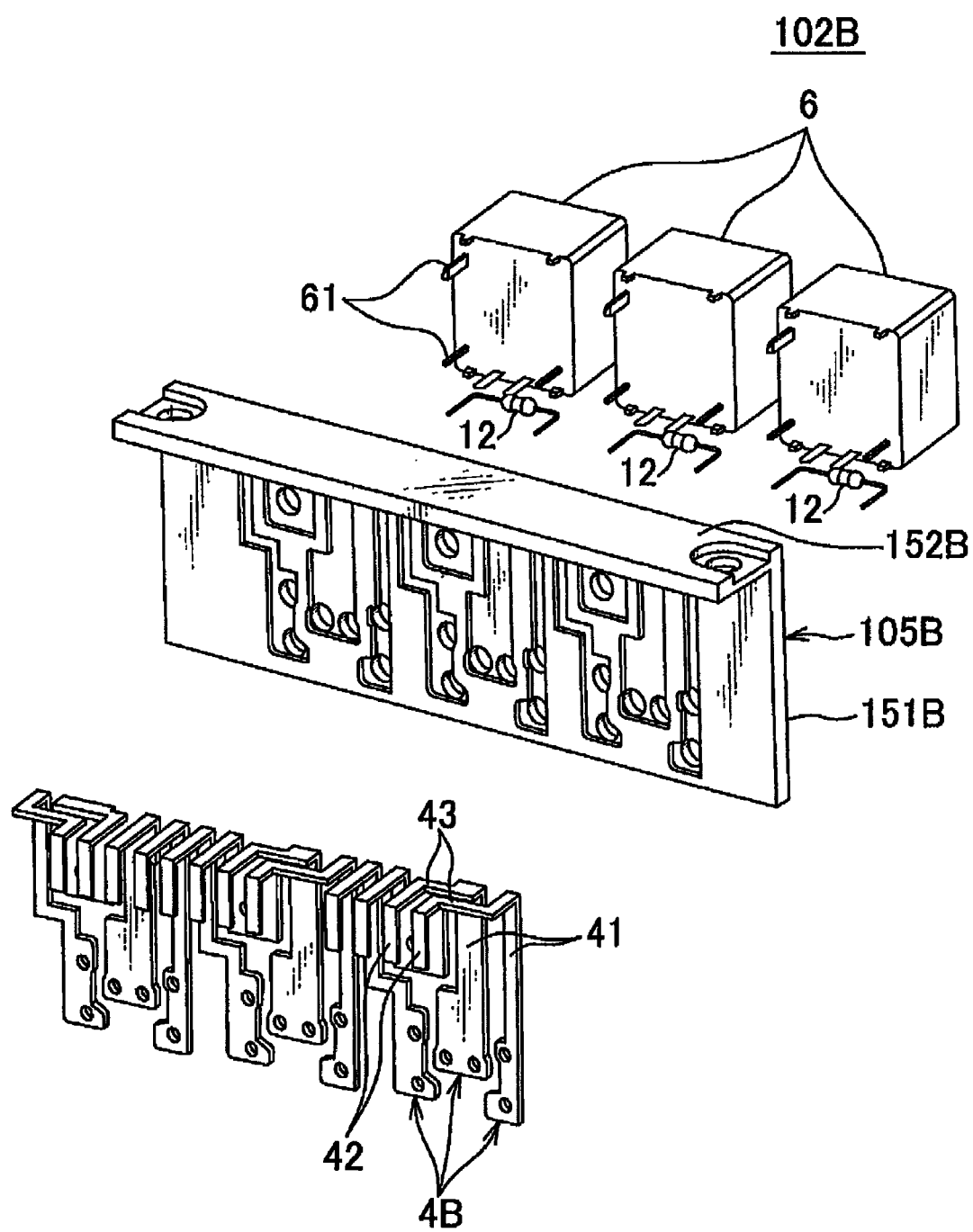
FIG. 14 is an exploded view of an electronic part substrate as shown in FIG. 13.

Referring to FIGS. 13 and 14, the electronic part module 101B includes an electronic part substrates 102B in which a plurality of bus bars 4B is coupled to an insulating panel 105B and a plurality of substrate relays 6 corresponding to electronic parts as defined in the claims appended hereto is electrically connected to the plurality of bus bars 4B; a case 103B for accommodating the electronic part substrates 102B therein and formed of synthetic resin; and a spacer 106 for securely retaining the female terminal fitting. Furthermore, the afore-mentioned connector-connecting portion 107B is made lateral to the case 103B.

As shown in FIGS. 13 and 14, the plurality of bus bars 4B includes a part-mounting portion 41 in which a relay 6 and a resistance 12 are mounted, an external terminal-connecting portion 42, and an intermediate portion 43 disposed between the part-mounting portion 41 and the external terminal-connecting portion 42. The external terminal-connecting portion 42 can form the connector-connecting portion 107B, thereby being inserted into and then electrically connected to the female terminal fitting.

Referring to FIG. 13, the insulating panel 105B includes a first surface 151B to which the part-mounting portion 41 of the bus bar 4B is attached, and a second surface 152B to which the intermediate portion 43 is attached. The first surface 151B is at right angle with the second surface 152B.

In the electronic part substrate 102B, all of the part-mounting portions 41 of the bus bars 4B are integrated into the first surface 151B, and lie in the same plane. All of the intermediate portions 43 of the bus bars 4B are integrated into the second surface 152B, and lie in the same plane. All of the external terminal-connecting portions 42 of the bus bars 4B extends from the second surface 152B and is parallel to the first surface 151B. In other words, in the electronic part substrate 102B, the direction in which the plurality of external terminal-connecting portions 42 and the plurality of relays 6 are aligned intersects the direction in which the female terminal fitting is electrically connected to the external terminal-connecting portion 42. Furthermore, the direction in which the female terminal fitting is electrically connected to the external terminal-connecting portion 42 is parallel to the first surface 151B.

The electronic part substrate 102B can be assembled in the same manner as described in above third embodiment (i.e., the electronic part substrate 102A).

Figure 12:
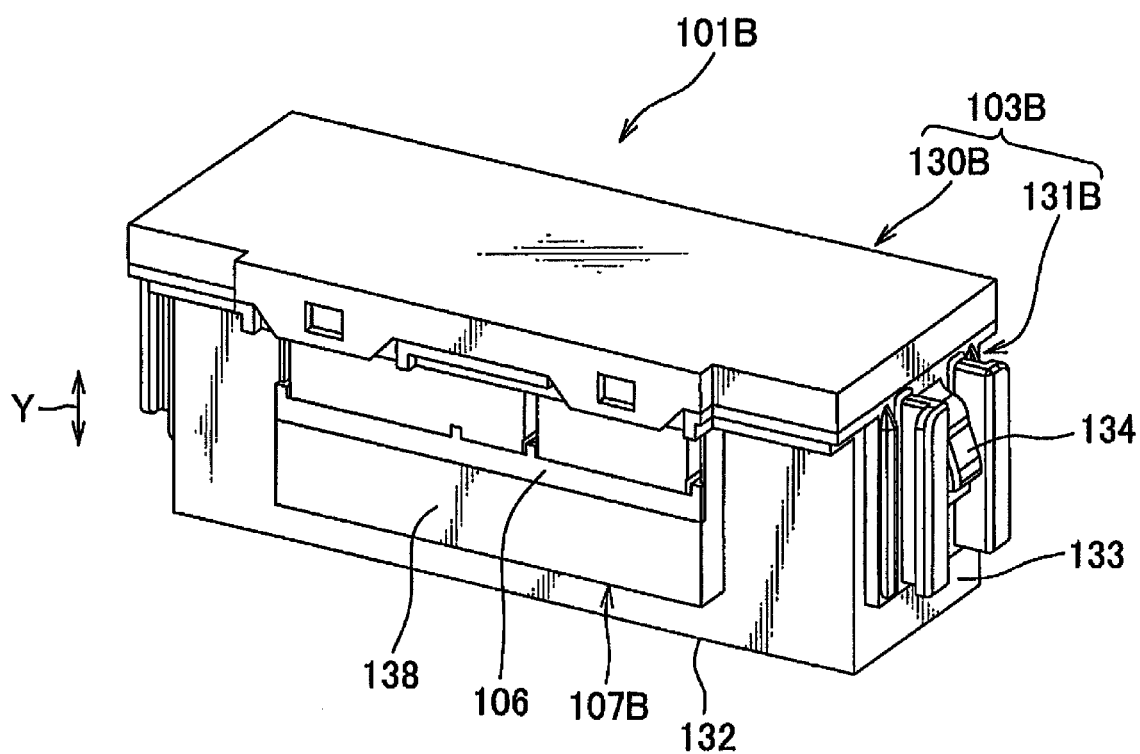
FIG. 12 is a perspective view of an electronic part module in accordance with a forth embodiment of the invention.

Referring to FIGS. 12 and 13, the case 103B includes a box-shaped portion 131B, and a cover 130B for closing the opening of the box-shaped portion 131B. The box-shaped portion 131B includes a bottom wall 132, a peripheral wall 133, a locking portion 134 formed on the outer surface of the peripheral wall 133, and a terminal-accommodating portion 138 formed on the outer surface of the peripheral wall 133. The terminal-accommodating portion 138 can form a connector-connecting portion 107B, which will be hereinafter described in detail, and is configured to position the plurality of external terminal-connecting portions 42 and the plurality of female terminal fittings therein. An opening 139, to which the spacer 106 is mounted, is provided in an outer wall of the terminal-accommodating portion 138.

The spacer 106 can be formed of synthetic resin. As the spacer 106 is mounted to the opening 139, the plurality of the female terminal fittings positioned in the terminal-accommodating portion 138 is securely retained or held by the spacer 106. As such, the plurality of female terminal fittings can be retained in the terminal-accommodating portion 138 without falling off from the terminal-accommodating portion 138.

The connector-connecting portion 107B includes the plurality of external terminal-connecting portion 42 of the afore-mentioned electronic part substrate 102B, and the terminal-accommodating portion 138 formed in the afore-mentioned case 103B. In other words, the electronic part substrates 102B is received into the box-shaped portion 131B in a direction as shown in FIG. 13. Accordingly, the plurality of the external terminal-connecting portions 42, in turn, is positioned within the terminal-accommodating portion 138. As a result, the connector-connecting portion 107B can be formed. Furthermore, the plurality of external terminal-connecting portions 42 is arranged in a row. The direction in which the female terminal fitting is inserted or fitted into the connector-connecting portion 107B is parallel to the first surface 151B.

In the afore-mentioned electronic part module 101B, the direction in which the plurality of external terminal-connecting portions 42 and the plurality of the relays 6 are aligned intersects with the direction in which the female terminal fitting is electrically connected to the external terminal-connecting portion 42 (i.e., the direction parallel to the first surface 151B). For the reason, the dimension of the case 103B along its height (i.e., a direction depicted by arrow "Y") can be remarkably decreased in comparison with the conventional electronic part module as depicted in FIG. 15.

When the forth embodiment of the electronic part module 101B is mounted to the electric junction box, the heightwise dimension of the case (of the electric junction box) can be downsized.

In the afore-mentioned embodiments, the electronic part modules 1A, 101A, 1B, and 101B are used for the vehicle electrical junction box. However, the inventive electronic part modules can be used for a variety of electrical or electronic devices. In the afore-mentioned embodiment, the substrate relays 6 are mounted to the electronic part substrates 2A, 102A, 2B, 102B. However, a variety of electronic parts can be mounted to the electronic part substrates.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An electronic part module, comprising:
    an electronic part substrate having an insulating panel to which a plurality of bus bars are attached, wherein each of the plurality of bus bars has a respective one of a plurality of external terminal-connecting portions; a part-mounting portion in which a corresponding one of a plurality of electronic parts is mounted; and an intermediate portion disposed between the part-mounting portion and the respective one of the plurality of external terminal-connecting portions and is electrically connected to the corresponding one of the plurality of electronic parts,
    a case for receiving the electronic part substrate therein, and
    a connector-connecting portion in which the plurality of external terminal-connecting portions of the plurality of bus bars are collected, and which is disposed between the plurality of electronic parts,
    wherein the plurality of electronic parts are aligned in two rows, and the plurality of external terminal-connecting portions are disposed between the two rows of the plurality of electronic parts,
    wherein the part-mounting portion and the intermediate portion lie in a same plane, and wherein the plurality of external terminal-connecting portions extend in a direction perpendicular to the insulating panel.

2. The electrical part module in accordance with claim 1, wherein each of the plurality of electronic parts is a relay.

3. An electronic part module, comprising:
    an electronic part substrate having an insulating panel to which a plurality of bus bars are attached, wherein each of the plurality of bus bars has a respective one of a plurality of external terminal-connecting portions; a part-mounting portion in which a corresponding one of a plurality of electronic parts is mounted; and an intermediate portion disposed between the part-mounting portion and the respective one of the plurality of external terminal-connecting portions and is electrically connected to the corresponding one of the plurality of electronic parts,
    the plurality of external terminal-connecting portions respectively extending from the insulating panel in a perpendicular direction,
    wherein a direction in which the plurality of external terminal-connecting portions extends is parallel to a direction to which the plurality of electronic parts extends, and
    wherein the part-mounting portion and the intermediate portion lie in a same plane, wherein the plurality of electronic parts are aligned in two rows, and the plurality of external terminal-connecting portions are disposed between the two rows of the plurality of electronic parts.

4. The electrical part module in accordance with claim 3, wherein each of the plurality of electronic parts is a relay.

5. An electronic part module, comprising:
    a pair of electronic part substrates, each having an insulating panel to which a plurality of bus bars are attached, wherein each of the plurality of bus bars has a respective one of a plurality of external terminal-connecting portions and is electrically connected to a corresponding one of a plurality of electronic parts,
    a case for receiving the pair of electronic part substrates therein, and
    a connector-connecting portion in which the plurality of external terminal-connecting portions of the plurality of bus bars is collected, and which is disposed between the plurality of electronic parts,
    wherein each of the plurality of bus bars further has a part-mounting portion to which the corresponding one of the plurality of electronic parts is mounted, and an intermediate portion disposed between the part-mounting portion and the respective one of the plurality of external terminal-connecting portions,
    wherein the insulating panel of each of the pair of electronic part substrates has a first surface to which the part-mounting portion is attached, a second surface to which the intermediate portion is attached, and a third surface which is opposed to the first surface and to which an end portion of the respective one of the plurality of external terminal-connecting portions adjacent to the intermediate portion is attached, and the insulating panel of each of the pair of electronic part substrates being monolithic, integrally formed in a J-shape together with the first surface, the second surface and the third surface, and wherein the pair of electronic part substrates is disposed such that the third surface of the pair of electronic part substrates are opposed to each other.

6. The electrical part module in accordance with claim 5, wherein each of the plurality of electronic parts is a relay.

7. An electronic part module, comprising:

each of a pair of electronic part substrates having an insulating panel to which a plurality of bus bars are attached, wherein each of the plurality of bus bars has a respective one of a plurality of external terminal-connecting portions and is electrically connected to a corresponding one of a plurality of electronic parts, the plurality of external terminal-connecting portions respectively extending from the insulating panel in a perpendicular direction, wherein a direction in which the plurality of external terminal-connecting portions extends is parallel to a direction to which the plurality of electronic parts extends, wherein each of the plurality of bus bars further has a part-mounting portion to which the corresponding one of the plurality of electronic parts is mounted, and an intermediate portion disposed between the part-mounting portion and the respective one of the plurality of external terminal-connecting portions, wherein the insulating panel of each of the pair of electronic part substrates has a first surface to which the part-mounting portion is attached, a second surface to which the intermediate portion is attached, and a third surface which is opposed to the first surface and to which an end portion of the respective one of the plurality of external terminal-connecting portions adjacent to the intermediate portion is attached, the insulating panel of each of the pair of electronic part substrates being monolithic, integrally formed in a J-shape together with the first surface, the second surface and the third surface, wherein the pair of electronic part substrates is disposed such that the third surface of the pair of electronic part substrates are opposed to each other, and wherein the plurality of electronic parts are aligned in two rows, and the plurality of external terminal-connecting portions are disposed between the two rows of the plurality of electronic parts.

8. The electrical part module in accordance with claim 7, wherein each of the plurality of electronic parts is a relay.

* * * * *